(12) United States Patent
Pan et al.

(10) Patent No.: US 11,410,273 B2
(45) Date of Patent: Aug. 9, 2022

(54) SYSTEMS AND METHODS FOR MULTISPECTRAL IMAGE DEMOSAICKING USING DEEP PANCHROMATIC IMAGE GUIDED RESIDUAL INTERPOLATION

(71) Applicants: Baidu USA, LLC, Sunnyvale, CA (US); Baidu.com Times Technology (Beijing) Co., Ltd., Beijing (CN)

(72) Inventors: Zhihong Pan, San Jose, CA (US); Baopu Li, Santa Clara, CA (US); Yingze Bao, Mountain View, CA (US); Hsuchun Cheng, Guangdong (CN)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 169 days.

(21) Appl. No.: 16/960,304

(22) PCT Filed: Jul. 5, 2019

(86) PCT No.: PCT/CN2019/094839
§ 371 (c)(1),
(2) Date: Jul. 6, 2020

(87) PCT Pub. No.: WO2021/003594
PCT Pub. Date: Jan. 14, 2021

(65) Prior Publication Data
US 2021/0241421 A1  Aug. 5, 2021

(51) Int. Cl.
*G06T 3/40* (2006.01)
*G06N 3/08* (2006.01)
*G06T 5/00* (2006.01)

(52) U.S. Cl.
CPC ............. *G06T 3/4015* (2013.01); *G06N 3/08* (2013.01); *G06T 3/4046* (2013.01); *G06T 5/003* (2013.01)

(58) Field of Classification Search
CPC ................ G06T 3/4015; G06T 3/4046; G06T 2207/20081; G06T 2207/20084;
(Continued)

(56) References Cited

U.S. PATENT DOCUMENTS

2008/0123097 A1\* 5/2008 Muhammed .............. G01J 3/02
356/419
2019/0096049 A1\* 3/2019 Kim ......................... G06N 3/08

FOREIGN PATENT DOCUMENTS

| CN | 101124462 A | 2/2008 |
| CN | 108288256 A | 7/2018 |
| JP | 2013108788 A | 6/2013 |

OTHER PUBLICATIONS

Sofiane Mihoubi, Olivier Losson, Menjamin Mathon, Ludovic Macaire. Multispectral demosaicing using pseudo-panchromatic image. IEEE Transactions on Computational Imaginer, IEEE, 2017, 3 (4), pp. 982-995. 10.1109/TCI.2017.2691553. hal-01507480 (Year: 2017).\*

(Continued)

*Primary Examiner* — Geoffrey E Summers
(74) *Attorney, Agent, or Firm* — North Weber & Baugh LLP

(57) ABSTRACT

Described herein are systems and embodiments for multispectral image demosaicking using deep panchromatic image guided residual interpolation. Embodiments of a ResNet-based deep learning model are disclosed to reconstruct the full-resolution panchromatic image from multispectral filter array (MSFA) mosaic image. In one or more embodiments, the reconstructed deep panchromatic image (DPI) is deployed as the guide to recover the full-resolution multispectral image using a two-pass guided residual interpolation methodology. Experiment results demonstrate that the disclosed method embodiments outperform some state- (Continued)

of-the-art conventional and deep learning demosaicking methods both qualitatively and quantitatively.

22 Claims, 8 Drawing Sheets

(58) Field of Classification Search
CPC ........... G06T 5/003; G06T 2207/10036; G06T 2207/10041; G06N 3/02–088
See application file for complete search history.

(56) References Cited

OTHER PUBLICATIONS

Dijkstra, Klaas, et al. "Hyperspectral demosaicking and crosstalk correction using deep learning." Machine Vision and Applications 30.1 (2019): 1-21. (Year: 2018).*
Shinoda, Kazuma, Shoichiro Yoshiba, and Madoka Hasegawa. "Deep demosaicking for multispectral filter arrays." arXiv preprint arXiv:1808.08021 (2018). (Year: 2018).*
Shopovska, Ivana, Ljubomir Jovanov, and Wilfried Philips. "RGB-NIR demosaicing using deep residual U-Net." 2018 26th Telecommunications Forum (Telfor). IEEE, 2018. (Year: 2018).*
Prakhar Amba, David Alleysson, Martial Mermillod. Demosaicing using Dual Layer Feedforward Neural Network. CIC 2018, Nov. 2018, Vancouver, Canada, hal-02106659 (Year: 2019).*
M. Eismann, "Hyperspectral Remote Sensing," SPIE / International Society for Optical Engineering, 2012. (4 pgs).
Lu et al.,"Medical hyperspectral imaging: A review," Journal of biomedical optics, vol. 19, No. 1, pp. 10901-1-25, 2014. (25 pgs).
Miao et al.,"Binary Tree-Based Generic Demosaicking Algorithm for Multispectral Filter Arrays," IEEE Transactionson Image Processing, vol. 15, No. 11, pp. 3550-3558, 2006.(10pgs).
Monno et al., "Adaptive Residual Interpolation for Color and Multispectral Image Demosaicking," Sensors, vol. 17, No. 12, pp. 2787-1-21, 2017. (17pgs).
Mihoubi et al.,"Multispectral demosaicing using pseudo-panchromatic image," IEEE Transactions on Computational Imaging,vol. 3, No. 4, pp. 982-995, 2017. (31 pgs).
Shinoda et al., "Deep demosaicking for multispectral filter arrays," arXiv preprint arXiv:1808.08021, 2018. (4pgs).
Kokkinos et al., "Deep Image Demosaicking using a Cascade ofConvolutional Residual Denoising Networks," arXiv preprint arXiv:1803.05215, 2018. (16 pgs).
He et al., "Guided image filtering," IEEE transactions on pattern analysis and machine intelligence, vol. 35, No. 6, pp. 1397-1409, 2013. (2pgs).
Yasuma et al.,"Generalized Assorted Pixel Camera: Post-Capture Control of Resolution, Dynamic Range and Spectrum," IEEE Transactions on Image Processing,vol. 19,No. 9,2010.(13pgs.
Foster et al.,"Frequency of metamerism in natural scenes," Journal of the Optical Society of America A,vol. 23,No. 10, pp. 2359-2372, 2006. (15 pgs).
International Search Report dated Mar. 27, 2020, in the International Patent Application No. PCT/CN2019/094839. (5 pgs).
International Written Opinion dated Mar. 27, 2020, in the International Patent Application No. PCT/CN2019/094839. (5 pgs).
Nascimento et al.,"Spatial distributions of local illumination color in natural scenes," Vision research, vol. 120, pp. 39-44, 2016. (6 pgs).
Monno et al.,"A Practical One-Shot Multispectral Imaging System Using a Single Image Sensor," IEEE Transactions on Image Processing,vol. 24,No. 10, pp. 3048-3059, 2015. (2pgs).
Monno et al.,"Single-Sensor RGB-NIR Imaging: High-Quality System Design and Prototype Implementation," IEEE Sensors Journal, vol. 19, No. 2, pp. 497-507, 2019. (2pgs).
Geelen et al.,"A compact snapshot multispectral imager with a monolithically integrated per-pixel filter mosaic," in Advanced Fabrication Technologies for Micro/Nano Optics & Photonics VII. International Society for Optics and Photonics, 2014, vol. 8974, p. 89740L. (3pgs).
Kingma et al.,"ADAM: A Method Forstochasticoptimization," arXiv preprint arXiv:1412.6980, 2014. (9pgs).

* cited by examiner

400

```
┌─────────────────────────────────────────────────────┐
│ For a MSFA pattern of m×n, use a sliding window size│─── 405
│                (m+1)×(n+1)                          │
└─────────────────────────────────────────────────────┘
                          │
                          ▼
┌─────────────────────────────────────────────────────┐
│ For each sliding step of the sliding window, use only pixels from │─── 410
│ the sparse grid in each subsample bands to estimate │
│                   coefficients                      │
└─────────────────────────────────────────────────────┘
                          │
                          ▼
┌─────────────────────────────────────────────────────┐
│ For each pixel on the sparse grid, obtain linear interpolation │─── 415
│ coefficients by averaging of the estimated coefficents for all │
│                      steps                          │
└─────────────────────────────────────────────────────┘
                          │
                          ▼
┌─────────────────────────────────────────────────────┐
│ Obtain full resolution coefficients for the subsampled image │─── 420
│ from the sparse subset using bilinear interpolation │
└─────────────────────────────────────────────────────┘
                          │
                          ▼
┌─────────────────────────────────────────────────────┐
│ Obtain a full resolution image from a linear transformation using │─── 425
│ the guided image and the obtained full resolution coefficients │
└─────────────────────────────────────────────────────┘
```

FIG. 4

SYSTEMS AND METHODS FOR MULTISPECTRAL IMAGE DEMOSAICKING USING DEEP PANCHROMATIC IMAGE GUIDED RESIDUAL INTERPOLATION

CROSS-REFERENCE TO RELATED APPLICATIONS

This patent application is filed pursuant to 35 USC § 371 as a US National Phase Application of International Patent Application No. PCT/CN2019/094839, filed on 5 Jul. 2019, entitled "SYSTEMS AND METHODS FOR MULTISPECTRAL IMAGE DEMOSAICKING USING DEEP PANCHROMATIC IMAGE GUIDED RESIDUAL INTERPOLATION," listing Zhihong Pan, Baopu Li, Yingze Bao, and Hsuchun Cheng as inventors, which patent document is incorporated by reference herein in its entirety and for all purposes.

TECHNICAL FIELD

The present disclosure relates generally to systems and methods for image processing. More particularly, the present disclosure relates to systems and methods for multispectral image demosaicking.

BACKGROUND

Snapshot multispectral imaging based on multispectral filter array (MSFA) has gained popularity recently for its size and speed. The added spectral information has led to its utilization in a broad range of application fields such as remote sensing and medical imaging. To reconstruct the full-resolution multispectral image, all the missing spectral information at each pixel must be estimated based on raw sensor measurements from neighboring pixels. This recovering process is referred to as demosaicking.

Demosaicking is one of the most crucial and challenging steps to reduce artifacts in both spatial and spectral domain. Various demosaicking methods for MSFA cameras have been proposed to continuously improve demosaicked image quality. It is always desirable to minimize the error between demosaicked image and original high-resolution image.

Accordingly, what is needed are systems and methods for multispectral image demosaicking for performance improvement.

SUMMARY

In a first aspect, the present the present disclosure provides a computer-implemented method for demosaicking a multispectral image from a multispectral filter arrays (MSFA) sensor with multiple sub-bands, the method comprising: using a deep neural network and the multispectral image to reconstruct a full resolution deep panchromatic image (DPI) of the multispectral image; for each sub-band of the multispectral image, performing at least one guided residual interpolation based on the reconstructed DPI to obtain a demosaicked sub-band image; and forming a demosaicked multispectral image comprising the demosaicked sub-band images.

In a first aspect, the present the present disclosure provides computer-implemented method for demosaicking a sub-band image in a multispectral image captured by a multispectral filter arrays (MSFA) sensor using one or more processors to cause steps to be performed comprising: using a deep neural network and the multispectral image to reconstruct a full resolution deep panchromatic image (DPI) of the multispectral image; subsampling the DPI relative to the sub-band to obtain a subsampled DPI; obtaining a subsampled residual image from a difference between the sub-band image and the subsampled DPI; using the DPI as a guide image in a guided interpolation on the subsampled residual image to obtain a demosaicked residual image; and adding the demosaicked residual image to the DPI to obtain a first-pass demosaicked sub-band image.

In a third aspect, the present disclosure provides a non-transitory computer-readable medium or media comprising one or more sequences of instructions which, when executed by one or more processors, causes the steps for demosaicking a multispectral image, from a multispectral filter arrays (MSFA) sensor, with multiple sub-bands to be performed comprising: reconstructing, using a deep neural network, the multispectral image to a full resolution deep panchromatic image (DPI); for each sub-band of the multispectral image, performing at least one guided residual interpolation based on the reconstructed DPI to obtain a demosaicked sub-band image; and forming a demosaicked multispectral image comprising the demosaicked sub-band images.

In a fourth aspect, the present disclosure provides a system for demosaicking a multispectral image from a multispectral filter arrays (MSFA) sensor with multiple sub-bands, the system comprising: at least one processor; and a memory storing instructions, the instructions when executed by the at least one processor, cause the at least one processor to perform the operations according to the first aspect.

In a fifth aspect, the present disclosure provides a system for demosaicking a sub-band image in a multispectral image captured by a multispectral filter arrays (MSFA) sensor, the system comprising: at least one processor; and a memory storing instructions, the instructions when executed by the at least one processor, cause the at least one processor to perform the operations according to the second aspect.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

Figure ("FIG.") 1 depicts architecture of a two-step demosaicking system, according to embodiments of the present disclosure.

FIG. 4 depicts a process of guided Interpolation for demosaicking, according to embodiments of the present disclosure.

DETAILED DESCRIPTION OF EMBODIMENTS

Figure 1:
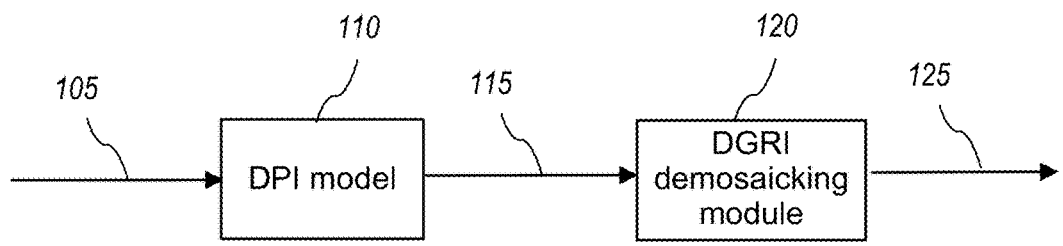

In the following description, for purposes of explanation, specific details are set forth in order to provide an understanding of the present disclosure. It will be apparent, however, to one skilled in the art that embodiments may be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the present disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. An image may be a still image or from a video.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Spectral imaging, including both hyperspectral images (HSIs) and multispectral images (MSIs), supplements additional information in spectral domain for each pixel. The added spectral information has led to its utilization in a broad range of application fields such as remote sensing and medical imaging. To measure a 3D spectral data cube on a 2D detector, various scanning techniques, including filter wheel and push broom scanners, have been developed. More recently, multispectral filter array (MSFA) is increasingly utilized in snapshot spectral cameras to capture a MSI in a single shot. Images captured by a MSFA camera have only one value at certain wavelength for each pixel, ordered in a designed MSFA mosaic pattern. To reconstruct the full-resolution multispectral image, all the missing spectral information at each pixel must be estimated based on raw sensor measurements from neighboring pixels. This recovering process is referred to as demosaicking.

Various demosaicking methods for MSFA cameras have been proposed to continuously improve demosaicked image quality. For MSFAs with primary bands, a binary tree-based edge-sensing (BTES) method was first designed to recover secondary bands using information estimated from primary bands. Another 4×4 MSFA took a dominant green band as the guide for residual interpolations to achieve MSI demosaicking. MSFA patterns without dominant bands were also devised and different demosaicking methods emerged in this process. The PPID method estimated a pseudo-panchromatic image first and used it as a guide to smooth its difference with each subsampled band. More recently, some proposed a new demosaicking model based on deep learning and experiments showed significant improvements comparing to PPID.

In this patent document, system and method embodiments using a two-step demosaicking process for MSIs called deep panchromatic image guided residual interpolation (DGRI) are disclosed. FIG. 1 depicts architecture of a two-step demosaicking system, according to embodiments of the present disclosure. The system comprises a deep neural network 110 and a DGRI demosaicking module 120. In one or more embodiments, the deep neural network is based on a residual neural network (ResNet) and may be referred as a deep panchromatic image (DPI) model or DPI-Net hereinafter. The DPI model receives a raw mosaic image 105 given a specific MSFA pattern and reconstructs a DPI 115 from the raw mosaic image. In one or more embodiments, the DPI model is trained to minimize the error between its output and the reference panchromatic image averaged from all bands of the ground-truth multispectral image. The DGRI demosaicking module 120 then recovers a full resolution MSI 125 from the DPI 115 using guided residual interpolation. In one or more embodiments, the DGRI demosaicking module 120 uses a two-pass demosaicking method for recovering the full resolution MSI 125. The first pass utilizes the DPI as a guide to filter the residual between each subsampled band and the DPI. The second pass takes the initially demosaicked band to further reduce the residual between itself and the subsampled mosaic image. Various detailed embodiments of the disclosed process are described in Section B and the experimental results are shown in Section C.

B. Embodiments for Demosaicking Process

In this section, demosaicking process embodiments are disclosed.

1. Embodiments of Deep Panchromatic Image

Figure 2:
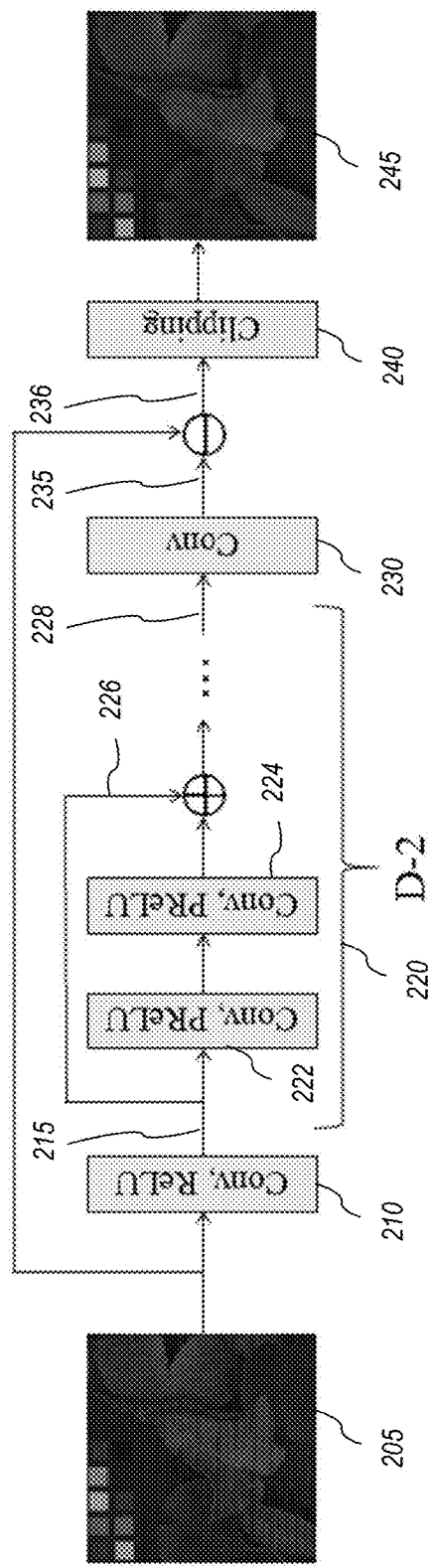
FIG. 2 depicts architecture of a deep panchromatic image network (DPI-Net), according to embodiments of the present disclosure.
Figure 3:
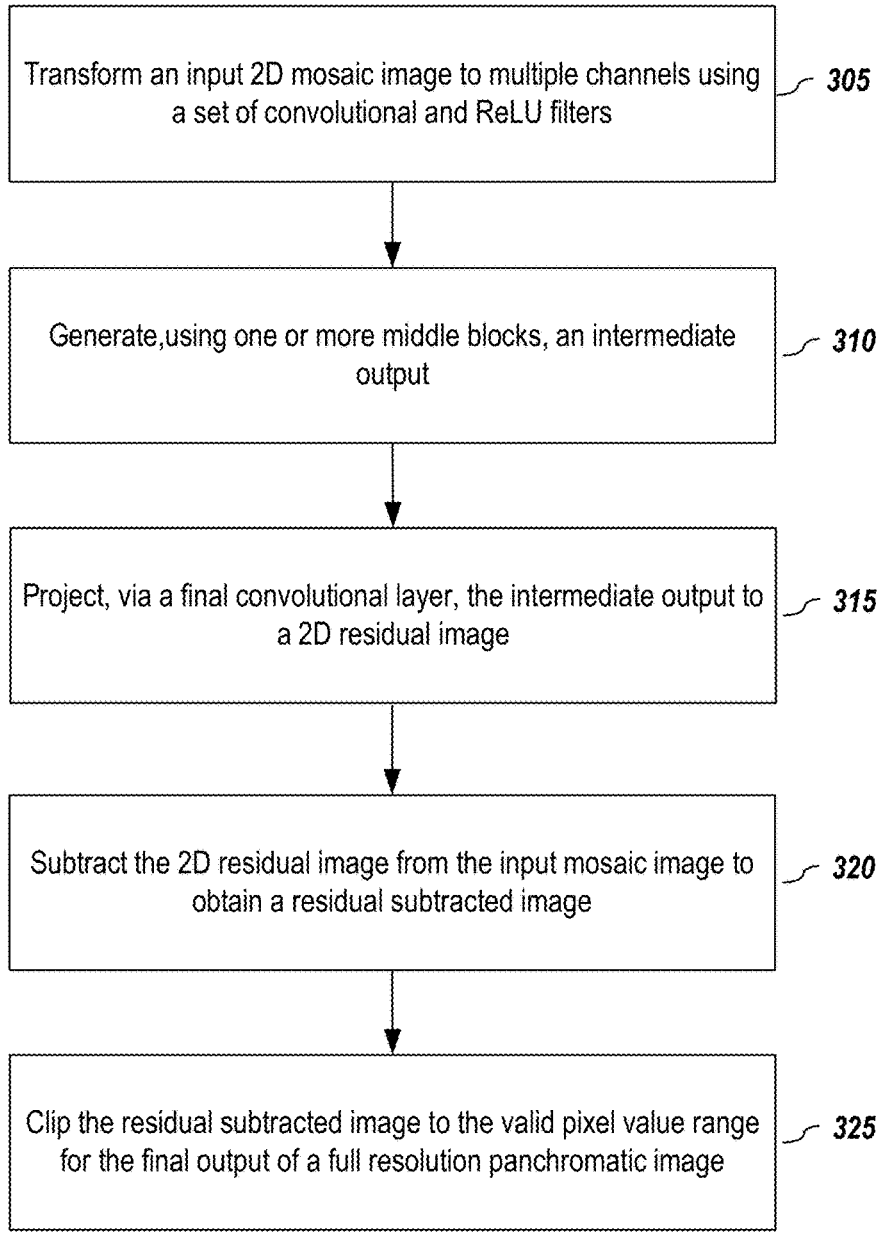
FIG. 3 depicts a process for recovering a full resolution panchromatic image from a multispectral mosaic image, according to embodiments of the present disclosure.

FIG. 2 depicts architecture of a deep panchromatic image network (DPI-Net), and FIG. 3 depicts a process for recovering a full resolution panchromatic image from a multispectral mosaic image using the DPI-Net, according to embodiments of the present disclosure. The DPI-Net recovers a full resolution panchromatic image from a multispectral mosaic image where each pixel is sampled from one of the MSFA filters. In one or more embodiments, the DPI-Net is a convolutional neural network (CNN), and has a total depth of D. The DPI-Net comprises a first block as a projection layer 210, one or more middle blocks 220, a final convolutional layer 230, and a clipping module 240. The projection layer 210 transforms (305) the input 2D mosaic image 205 to multiple channels 215 using a set of convolutional and rectified linear unit (ReLU) filters. For the one or more middle blocks (D-2) 220, each block consists of two layers 222 and 224 of convolutions and parameterized ReLUs (PReLUs) with a shortcut connection 226 between the block input and block output. In one or more embodiments, batch normalization (BN) was not included in the whole DPI network since it was found that BN layer does not improve the performance of reconstruction. The one or more middle blocks 220 generate (310) an intermediate output 228, which is projected (315) via the final convolutional layer 230 to a 2D residual image 235. The 2D residual image 235 is subtracted (320) from the input 205 to obtain a residual subtracted image 236. The residual subtracted image 236 is then clipped (325), using the clipping module 240, to a valid pixel value range for the final output 245, which is the full resolution panchromatic image.

In one or more embodiments, the two layers 222 and 224 of convolutions and PReLUs may or may not have the same kernel size. For example, the first layer 222 may have a size of 7×7, while the second layer may have a size of 5×5 instead.

In one or more embodiments, the DPI-Net is a residual network which may has certain similarities to the deep denoising network ResDNet (Kokkinos et al., Deep image demosaicking using a cascade of convolutional residual denoising networks, Proceedings of the European Conference on Computer Vision (ECCV), 2018 pp. 317-333) as the mosaic image may be a form of noisy panchromatic image. However, as the difference between the mosaic image and band-averaging panchromatic image has a pre-determined range, the DPI-Net in the present invention document does not need noise variance. Additionally, embodiments of the DPI-Net may adopt three steps, which were demonstrated to be beneficial. First, the size of kernel matters more over the depth of layers. Secondly, a special padding scheme may be used in the first block 210, which is a limited rolling shift of the first MSFA pattern on each side. In one or more embodiments, the special padding scheme is a circular padding with the number of padded rows (both up and down) and columns (both left and right) the same as the MSFA pattern. Lastly, during training, a sharpen filter illustrated below may be applied to at least one of the panchromatic images before calculating the loss function because it may provide better gradient descent.

$$\begin{bmatrix} 0 & -1 & 0 \\ -1 & 5 & -1 \\ 0 & -1 & 0 \end{bmatrix}$$

In one or more embodiments, the sharpen filter is applied to both the panchromatic image reconstructed from the DPI-Net and the reference panchromatic images. Therefore, instead of calculating loss function between the panchromatic image reconstructed from the DPI-Net or the reference panchromatic image, the two sharpened panchromatic images are used for loss function calculation.

2. Embodiments of Guided Interpolation for Demosaicking

Guided filtering is a recently proposed method with excellent structure-preserving capabilities. It approximates the filtering as a linear approximation within a small window. As illustrated in Equation (1) below, for a given window w, the filtered value of any pixel (x, y) within the window is approximated as a linear transformation of original value:

$$\hat{I}(x,y) = a_w G(x,y) + b_w, \forall (x,y) \in w \qquad (1)$$

where $G(x, y)$ is the guided image value at pixel $(x, y)$ and $\hat{I}(x, y)$ is the filtered image value. Using linear regression method, the two coefficients $a_w$ and $b_w$ may be estimated by minimizing the difference between $I(x, y)$ and $\hat{I}(x, y)$ for all pixels in the window w.

In one or more embodiments, the filter is applied to the whole image by sliding the window so that each pixel (x, y) is estimated multiple times for all windows that (x, y) belongs to. In one or more embodiments, the linear transformation coefficients for each pixel is averaged over these estimations as $$a(x, y) = \frac{1}{|w|} \sum_{(x,y) \in w} a_w \qquad (2)$$

$$b(x, y) = \frac{1}{|w|} \sum_{(x,y) \in w} b_w$$

where $|w|$ is the number of windows one pixel resides in, the same as the number of pixels inside a window. The filtered image may be calculated as $$\hat{I}(x,y) = a(x,y) * I(x,y) + b(x,y) \qquad (3)$$

For the above guided filtering, the input image and guide image have the same number of pixels. In one or more embodiments, to apply the same method to MSI demosaicking, each subsampled band needs to be pre-processed using upsampling methods like bilinear interpolation. FIG. 4 depicts a process of guided Interpolation for demosaicking, according to embodiments of the present disclosure. In one or more embodiments, for the proposed MSI demosaicking, a new process is put forward for the estimation of $a(x, y, \lambda)$ and $b(x, y,$ where $\lambda)$, refers to the wavelength of a specific filter in MSFA. First, assuming the MSFA pattern is of m×n, a sliding window size (m+1)×(n+1) is used (405). The sliding steps are m and n in corresponding directions respectively. For each step the window covers 4 pixels from the sparse grid in each subsampled bands and only these 4 pixels are used (410) to estimate coefficients $a_w(\lambda)$ and $b_w(\lambda)$. For each pixel (x, y) on the sparse subsampled grid, linear interpolation coefficients $a(x, y, \lambda)$ and $b(x, y, \lambda)$ may be obtained (415) using the average of the estimated coefficients for all steps shown in equation (4) below since each pixel is only covered by 4 windows.

$$a(x, y, \lambda) = \frac{1}{4} \sum_{(x,y) \in w} a_w(\lambda) \quad (4)$$

$$b(x, y, \lambda) = \frac{1}{4} \sum_{(x,y) \in w} b_w(\lambda)$$

The full resolution coefficients a(x, y, and b(x, y, λ) for a subsampled image are obtained (420) from the sparse grid or subset using bilinear interpolation. The last step of the guided interpolation is to obtain (425) a full resolution image for the sub-band from a linear transformation using the guided image I (x, y, λ) and the obtained full resolution coefficients, showing as:

$$\hat{I}(x,y,\lambda) = a(x,y,\lambda) * I(x,y,\lambda) + b(x,y,\lambda) \quad (5)$$

3. Embodiments of Two-Pass Guided Residual Interpolation

Figure 5:
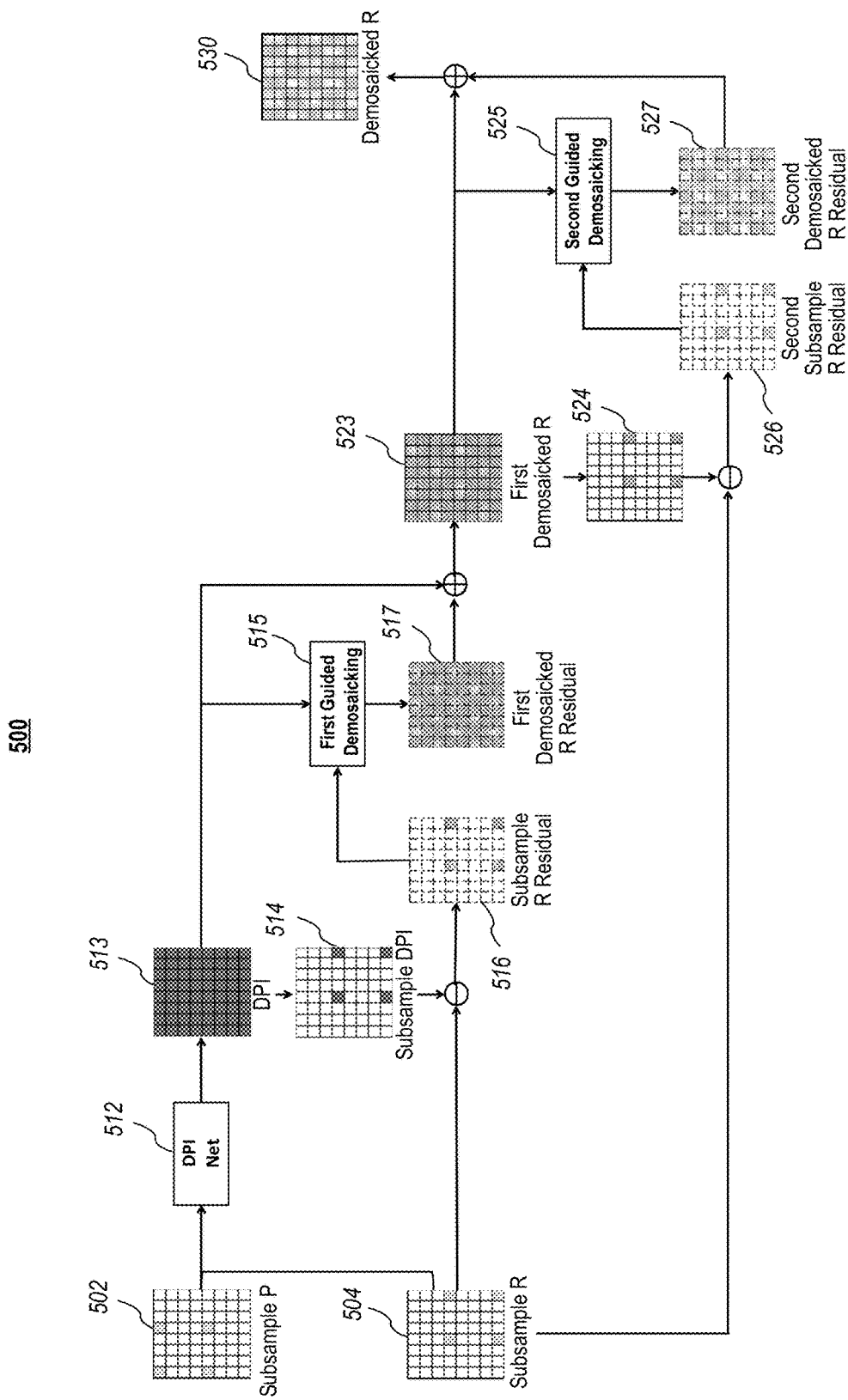
FIG. 5 graphically depicts a DPI guided residual interpolation (DGRI) demosaicking process, according to embodiments of the present disclosure.
Figure 6:
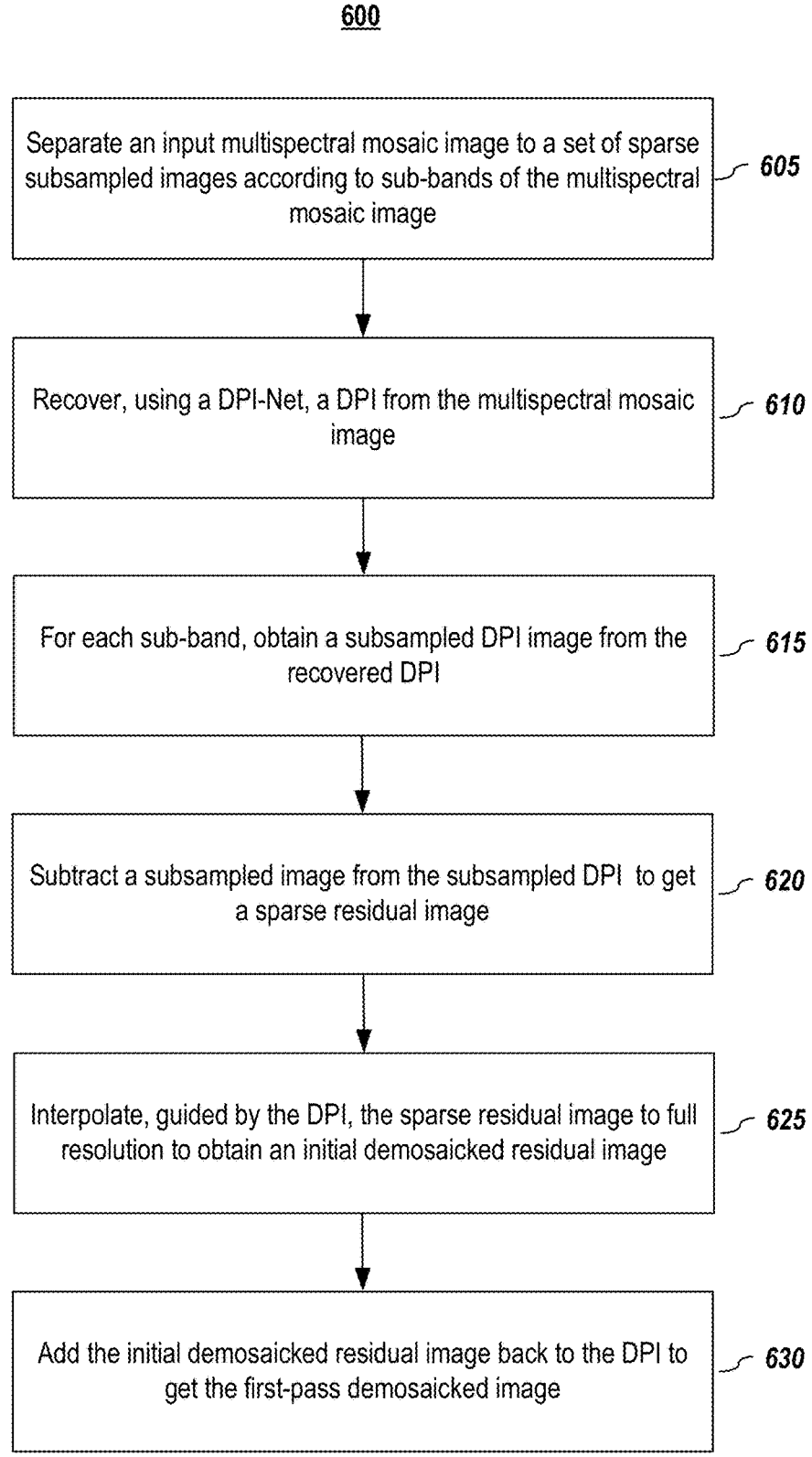
FIG. 6 depicts a process for first-pass guided residual interpolation using a DPI as a guide image, according to embodiments of the present disclosure.

FIG. 5 graphically depicts a DPI guided residual interpolation (DGRI) demosaicking process, according to embodiments of the present disclosure the DGRI demosaicking process may involve one or more demosaicking passes for recovering the full resolution MSI. FIG. 6 depict a process for a first-pass using a DPI as a guide image for guided residual interpolation, according to embodiments of the present disclosure.

As shown in the FIG. 5, an input multispectral mosaic image 502 may be separated (605) to a set of sparse subsampled or sub-band images, each corresponding to one filter or sub-band in the MSFA. A full resolution deep panchromatic image (DPI) is recovered (610) from the multispectral mosaic image using the DPI-Net 512. A subsampled DPI image 514 is obtained (615) from the recovered DPI. For one sub-band image 504 (using the subsampled R band image as an example, the sub-band for the sub-band image 504 corresponds to the subsampled DPI image 514), it is first subtracted (620) from the subsampled DPI 514 to get a sparse residual image 516. Using the DPI as a guide image 515, this sparse residual image 516 is interpolated (625) to full resolution to obtain an initial demosaicked residual image 517, which is then added back (630) to the DPI to get the first-pass demosaicked image 523 corresponding to the R band.

Figure 7:
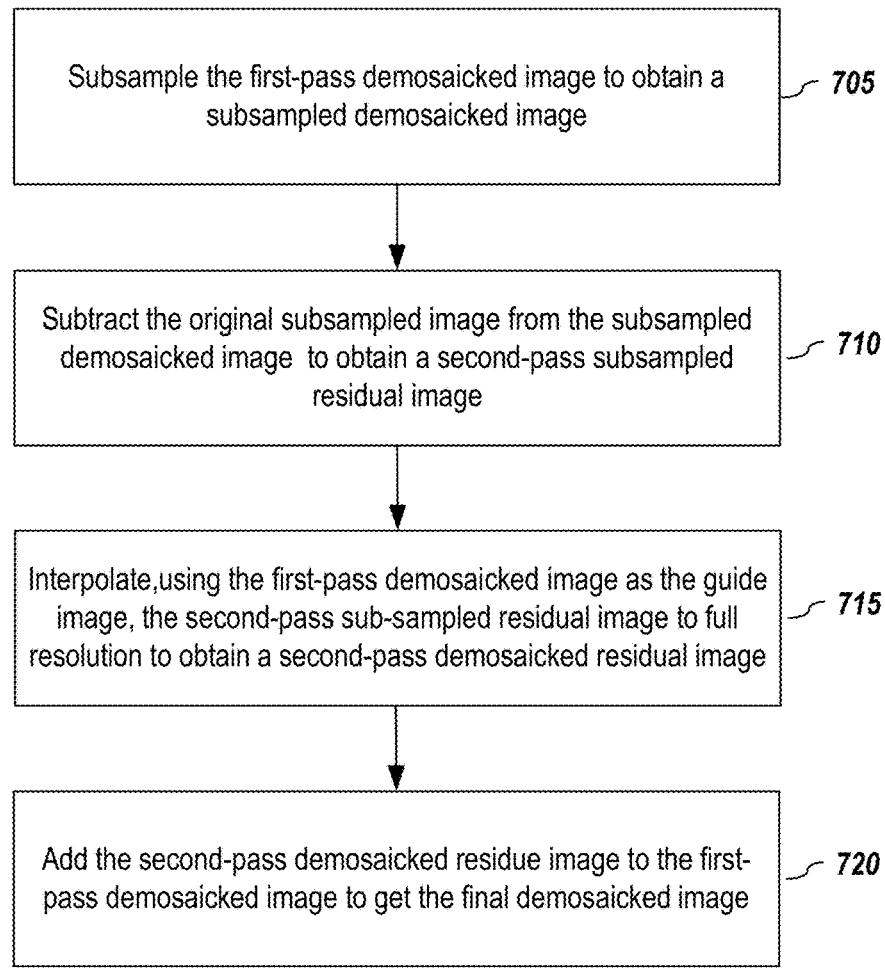
FIG. 7 depicts a process for second-pass guided residual interpolation using the first-pass demosaicked image as a guide image, according to embodiments of the present disclosure.

In one or more embodiments, additional processing may be applied to further reduce the residual between the first-pass demosaicked image 523 and the subsampled mosaic image. FIG. 7 depict a second pass using the first-pass demosaicked image as a guide image for guided residual interpolation, according to embodiments of the present disclosure.

In the second-pass, the first-pass demosaicked image 523 is subsampled (705) to obtain a subsampled demosaicked image 524. The original sub-band image 504 is subtracted (710) from the subsampled demosaicked image 524 to obtain a second-pass subsampled R residual image 526. A similar guided interpolation method, using the first-pass demosaicked image 523 as the guide image 525, is further applied to interpolated (715) the second-pass subsampled R residual image 526 to full resolution to obtain a second-pass demosaicked residual image 527. The second-pass demosaicked residue 527 is added (720) to the first-pass demosaicked image 523 to get the final (second-pass) demosaicked R image 530. In one or more embodiments, the second pass is necessary to minimize the difference between to the demosaicked image and the raw image at the sparse grid of subsampled R band. All other sub-bands may follow the same procedure to recover demosaicked images at other sub-bands, and thus a fully demosaicked MSI may be obtained.

C. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

In one or more experimental settings, to evaluate the performance of the proposed process, the most popular peak-signal-to-noise ratio (PSNR) was adopted to represent the quality of a multispectral image I. A MSI of dimension m×n×w may be defined as I(x, y, $\lambda_i$), where x=1, . . . ,m; y=1, . . . , n; and i=1, . . . , s. $\lambda_i$ de-notes a wavelength in a s-band multispectral image. I (x, y) corresponds to the spectral reflectance at pixel (x, y) in the image, which is a vector of s elements, one for each $\lambda_i$. To define image quality metrics, the original reference image is denote as $I_r$ and the test image acquired by an imaging system is denote as $I_t$. To characterize the multispectral image noise, the root mean square error (RMSE) was calculated for each pixel then averaged over all pixels. For each pixel, the RMSE(x, y) calculates the difference of spectral responses between a pixel in the reference image and the corresponding pixel in the test image as below:

$$RMSE(x, y) = \sqrt{\frac{1}{s} \sum_{i=1}^{s} [I_r(x, y, \lambda_i) - I_t(x, y, \lambda_i)]^2} \quad (6)$$

Then the PSNR may be derived:

$$PSNR = 20 \cdot \log_{10} \left( \frac{MAX_I}{\frac{1}{m \times n} \sum_{x=1}^{m} \sum_{y=1}^{n} RMSE(x, y)} \right) \quad (7)$$

where $MAX_I$ is maximum possible pixel value of the multispectral image.

In one or more experiments, various multispectral data sets were used for model training and testing. All data sets were resampled to 16 bands with central wavelengths at $\lambda_i \in \{469, 480, 489, 499, 513, 524, 537, 551, 552, 566, 580, 590, 602, 613, 621, 633\}$(nm). These bands are also the configurations implemented in the top off-the-shelf MSFA-based systems available on the market today, namely XIMEA's xiSpec camera using IMEC's MSFA technology. In experiments in the present patent document, all images were converted to reflectance values between 0 to 1, and segmented to 128×128 patches when used for DPI training and validation.

For the DPI model training, each 16 band MSI patch was processed to generate a mosaic image as the network input by subsampling each band according to a 4×4 MSFA pattern. It was also transformed to a panchromatic image by averaging the 16 bands, which were used to compare with the network output for calculations of loss functions. These patches were randomly separated to a training set and a validation set with a rough 4:1 ratio. The training set was used in back propagation and gradient descent for model convergence, while the validation set was used to find the optimal model based on average PSNR between the network output and the band-averaging panchromatic image for all patches.

In one or more experimental settings, the DPI network depth was set at D=7. A 9×9 kernel size and a number of 24 filters were deployed in the first convolution block. The middle 3 blocks had the same two layer structure, and a 7×7 and 5×5 kernel size was used for the first and second layer respectively, where the channels re-main as 24. The last block projected the 24 channels to one 2D residual image using a kernel size of 5×5. In one or more experimental settings, all weights were initialized as random numbers as sampled from a normal distribution and the optimization was carried out using adaptive moment estimation (ADAM) (Kingma et al., ADAM: A Method for Stochastic Optimization, arXiv preprint arXiv:1412.6980, 2014). In one or more experimental settings, the training procedure starts with an initial learning rate of $10^{-3}$ and multiplied by a ratio of 0.95 for every 10 epochs.

D. Some Conclusions

Disclosed herein are system and method embodiment to demosaic multispectral images from MSFA sensors. Embodiments of a deep neural network using multiple ResNet layers are proposed to first recover a panchromatic image in full spatial resolution from a raw mosaic image. To enhance the demosaicking process, embodiments of a two-pass guided residual interpolation method are further used to demosaic each subsampled band separately before stacking together to reconstruct the full resolution MSI image. Experiment results demonstrate that disclosed embodiments outperform start-of-the-art MSFA demosaicking methods visually as well as in terms of PSNR.

E. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 8:
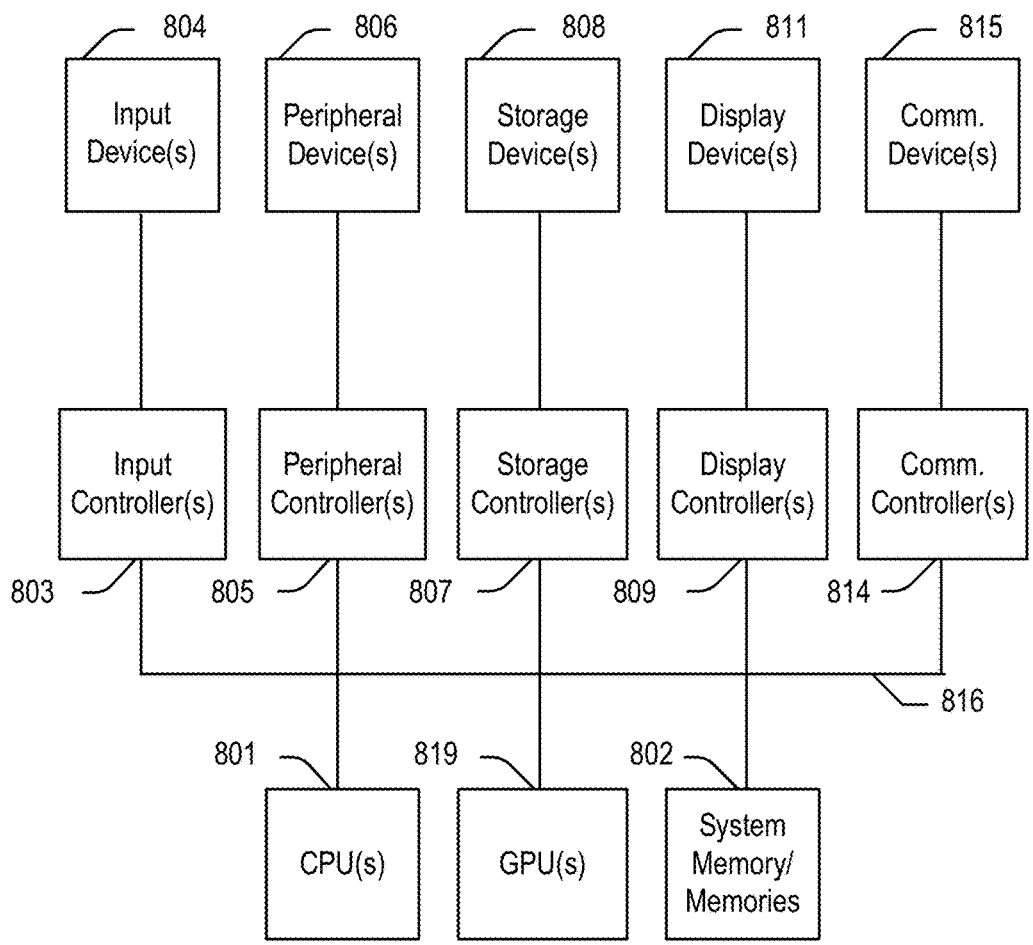
FIG. 8 depicts a simplified block diagram of a computing device/information handling system, in accordance with embodiments of the present disclosure.

FIG. 8 depicts a simplified block diagram of a computing device/information handling system (or computing system) according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more central processing units (CPU) 801 that provides computing resources and controls the computer. CPU 801 may be implemented with a microprocessor or the like, and may also include one or more graphics processing units (GPU) 819 and/or a floating-point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, touchscreen, and/or stylus. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present invention. Storage device(s) 808 may also be used to store processed data or data to be processed in accordance with the invention. The system 800 may also include a display controller 809 for providing an interface to a display device 811, which may be a cathode ray tube (CRT), a thin film transistor (TFT) display, organic light-emitting diode, electroluminescent panel, plasma panel, or other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

The invention claimed is:

1. A computer-implemented method for demosaicking a multispectral image from a multispectral filter arrays (MSFA) sensor with multiple sub-bands, the method comprising:

using a deep neural network and the multispectral image to reconstruct a full resolution deep panchromatic image (DPI) of the multispectral image;

for each sub-band of the multispectral image, performing at least one guided residual interpolation based on the reconstructed DPI to obtain a demosaicked sub-band image; and forming a demosaicked multispectral image comprising the demosaicked sub-band images.

2. The computer-implemented method of claim 1 wherein the step of, for each sub-band of the multispectral image, performing at least one-pass guided residual interpolation based on the reconstructed DPI to obtain the demosaicked sub-band image comprises:

subsampling the reconstructed DPI relative to the sub-band to obtain a subsampled DPI;

obtaining a subsampled residual image from a difference between a sub-band image corresponding to the sub-band and the subsampled DPI;

using the reconstructed DPI as a guide image in a first guided interpolation on the subsampled residual image to obtain a demosaicked residual image; and adding the demosaicked residual image to the reconstructed DPI to obtain a first-pass demosaicked sub-band image.

3. The computer-implemented method of claim 2 wherein the step of, for each sub-band of the multispectral image, performing at least one guided residual interpolation based on the reconstructed DPI to obtain the demosaicked sub-band image further comprises:

subsampling the first-pass demosaicked sub-band image relative to the sub-band to obtain a second-pass subsampled image;

obtaining a second-pass subsampled residual image from a difference between the sub-band image and the second-pass subsampled image;

using the first-pass demosaicked sub-band image as a guide image in a second guided interpolation on the second-pass subsampled residual image to obtain a second-pass demosaicked residual image; and adding the second-pass residual image to the first-pass demosaicked sub-band image to obtain a second-pass demosaicked sub-band image.

4. The computer-implemented method of claim 3 wherein the first guided interpolation and the second guided interpolation comprise steps of:

for a MSFA pattern of m×n, m and n being positive integer numbers, using a sliding window size (m+1)×(n+1) with m and n sliding steps in corresponding directions in the MSFA pattern respectively, the MSFA pattern corresponding to the subsampled residual image in the first guided interpolation or the second-pass subsampled residual image in the second guided interpolation;

for each sliding step of the sliding window, using only pixels from a sparse grid in each sub-band to estimate coefficients;

for each pixel in the sparse grid, obtaining linear interpolation coefficients using an average of the estimated coefficients for all sliding steps;

obtaining full resolution coefficients for the sub-band of the multispectral image from the sparse grid using bilinear interpolation; and obtaining a full resolution image for the sub-band from a linear transformation using the reconstructed DPI as a guide image and the obtained full resolution coefficients in the first guided interpolation, or from a linear transformation using the first-pass demosaicked subband image as a guide image and the obtained full resolution coefficients in the second guided interpolation, where the full resolution image is the demosaicked residual image in the first guided interpolation, or the second-pass demosaicked residual image in the second guided interpolation.

5. The computer-implemented method of claim 1 wherein the deep neural network is a convolutional neural network (CNN), the CNN comprising:
   a first block as a projection layer transforming the multispectral image to multiple channels;
   one or more middle blocks to generate an intermediate output based on the multiple channels, each block having two layers with each layer comprising a convolutional and a rectified linear unit (ReLU) filters, and a skip connection between an input and an output of each block;
   a final convolutional layer projecting the intermediate output to a 2D residual image; and
   a clipping module clipping a residual subtracted image obtained by subtracting the 2D residual image from the multispectral image to a valid pixel value range for the reconstructed DPI.

6. The computer-implemented method of claim 5 wherein the CNN is pre-trained using a training data set to minimize a loss between the reconstructed DPI and a reference panchromatic image averaged from all bands of a ground-truth multispectral image.

7. The computer-implemented method of claim 6 wherein during the pre-training, a sharpen filter is applied to both the reconstructed DPI and the reference panchromatic image before calculating the loss.

8. The computer-implemented method of claim 5 wherein a padding scheme is used in the first block for a limited rolling shift of a first MSFA pattern on each side.

9. A system for demosaicking a multispectral image from a multispectral filter arrays (MSFA) sensor with multiple sub-bands, the system comprising:
   at least one processor; and
   a memory storing instructions, the instructions when executed by the at least one processor, cause the at least one processor to perform the method of claim 1.

10. A computer-implemented method for demosaicking a sub-band image in a multispectral image captured by a multispectral filter arrays (MSFA) sensor using one or more processors to cause steps to be performed comprising:
   using a deep neural network and the multispectral image to reconstruct a full resolution deep panchromatic image (DPI) of the multispectral image;
   subsampling the DPI relative to the sub-band to obtain a subsampled DPI;
   obtaining a subsampled residual image from a difference between the sub-band image and the subsampled DPI;
   using the DPI as a guide image in a guided interpolation on the subsampled residual image to obtain a demosaicked residual image; and
   adding the demosaicked residual image to the DPI to obtain a first-pass demosaicked sub-band image.

11. The computer-implemented method of claim 10 further comprising:
   subsampling the first-pass demosaicked sub-band image relative to the sub-band to obtain a second-pass subsampled image;
   obtaining a second-pass subsampled residual image from a difference between the sub-band image and the second-pass subsampled image;
   using the first-pass demosaicked sub-band image as a guide image in a second guided interpolation on the second-pass subsampled residual image to obtain a second-pass demosaicked residual image; and
   adding the second-pass residual image to the first-pass demosaicked sub-band image to obtain a second-pass demosaicked sub-band image.

12. The computer-implemented method of claim 11 wherein the guided interpolation and the second guided interpolation comprises steps of:
   for a MSFA pattern of m×n, m and n being positive integer numbers, using a sliding window size (m+1)×(n+1) with m and n sliding steps in corresponding directions in the MSFA pattern respectively, the MSFA pattern corresponding to the subsampled residual image in the guided interpolation or the second-pass subsampled residual image in the second guided interpolation;
   for each sliding step of the sliding window, using only pixels from a sparse grid in each sub-band to estimate coefficients;
   for each pixel in the sparse grid, obtaining linear interpolation coefficients using an average of the estimated coefficients for all sliding steps;
   obtaining full resolution coefficients for the sub-band of the multispectral image from the sparse grid using bilinear interpolation; and
   obtaining a full resolution image for the sub-band from a linear transformation using the reconstructed DPI as a guide image and the obtained full resolution coefficients in the guided interpolation, or from a linear transformation using the first-pass demosaicked sub-band image as a guide image and the obtained full resolution coefficients in the second guided interpolation, where the full resolution image is the demosaicked residual image in the guided interpolation, or the second-pass demosaicked residual image in the second guided interpolation.

13. The computer-implemented method of claim 10 wherein the deep neural network is a convolutional neural network (CNN), the CNN comprising:
   a projection layer transforming the multispectral image to multiple channels;
   one or more middle blocks to generate an intermediate output based on the multiple channels, each block having two layers with each layer comprising a convolutional and a rectified linear unit (ReLU) filters, and a skip connection between each block;
   a final convolutional layer projecting the intermediate output to a 2D residual image; and
   a clipping module clipping a residual subtracted image obtained by subtracting the 2D residual image from the multispectral image to a valid pixel value range for the reconstructed DPI.

14. The computer-implemented method of claim 13 wherein the CNN is pre-trained using a training data set to minimize a loss between the reconstructed DPI and a reference panchromatic image averaged from all bands of a ground-truth multispectral image.

15. The computer-implemented method of claim 14 wherein during the pre-training, a sharpen filter is applied to both the reconstructed DPI and the reference panchromatic image before calculating the loss.

16. A system for demosaicking a sub-band image in a multispectral image captured by a multispectral filter arrays (MSFA) sensor, the system comprising:

at least one processor; and
a memory storing instructions, the instructions when executed by the at least one processor, cause the at least one processor to perform the method of claim 10.

17. A non-transitory computer-readable medium or media comprising one or more sequences of instructions which, when executed by one or more processors, causes the steps for demosaicking a multispectral image, from a multispectral filter arrays (MSFA) sensor, with multiple sub-bands to be performed comprising:
reconstructing, using a deep neural network, the multispectral image to a full resolution deep panchromatic image (DPI);
for each sub-band of the multispectral image, performing at least one guided residual interpolation based on the reconstructed DPI to obtain a demosaicked sub-band image; and
forming a demosaicked multispectral image comprising the demosaicked sub-band images.

18. The non-transitory computer-readable medium or media of claim 17 wherein performing at least one-pass guided residual interpolation based on the reconstructed DPI to obtain the demosaicked sub-band image comprises:
subsampling the reconstructed DPI relative to the sub-band to obtain a subsampled DPI;
obtaining a subsampled residual image from a difference between a sub-band image corresponding to the sub-band and the subsampled DPI;
using the reconstructed DPI as a guide in a first guided interpolation on the subsampled residual image to obtain a demosaicked residual image; and
adding the demosaicked residual image to the reconstructed DPI to obtain a first-pass demosaicked sub-band image.

19. The non-transitory computer-readable medium or media of claim 18 wherein performing at least one-pass guided residual interpolation based on the reconstructed DPI to obtain the demosaicked sub-band image further comprises:
subsampling the first-pass demosaicked sub-band image relative to the sub-band to obtain a second-pass subsampled image;
obtaining a second-pass subsampled residual image from a difference between the sub-band image and the second-pass subsampled image;
using the first-pass demosaicked sub-band image as a guide in a second guided interpolation on the second-pass subsampled residual image to obtain a second-pass demosaicked residual image; and
adding the second-pass residual image to the first-pass demosaicked sub-band image to obtain a second-pass demosaicked sub-band image.

20. The non-transitory computer-readable medium or media of claim 19 wherein the first guided interpolation or the second guided interpolation comprises steps of:
for a MSFA pattern of m×n, m and n being positive integer numbers, using a sliding window size (m+1)×(n+1) with m and n sliding steps in corresponding directions in the MSFA pattern respectively, the MSFA pattern corresponding to the subsampled residual image in the first guided interpolation or the second-pass subsampled residual image in the second guided interpolation;
for each sliding step of the sliding window, using only pixels from a sparse grid in each sub-band to estimate coefficients;
for each pixel in the sparse grid, obtaining linear interpolation coefficients using an average of the estimated coefficients for all sliding steps;
obtaining full resolution coefficients for the sub-band of the multispectral image from the sparse grid using bilinear interpolation; and
obtaining a full resolution image for the sub-band from a linear transformation using the reconstructed DPI as a guide image and the obtained full resolution coefficients in the first guided interpolation, or from a linear transformation using the first-pass demosaicked sub-band image as a guided image and the obtained full resolution coefficients in the second guided interpolation, where the full resolution image is the demosaicked residual image in the first guided interpolation, or the second-pass demosaicked residual image in the second guided interpolation.

21. The non-transitory computer-readable medium or media of claim 20 wherein the deep neural network is a convolutional neural network (CNN), the CNN comprising:
a projection layer transforming the multispectral image to multiple channels;
one or more middle blocks to generate an intermediate output based on the multiple channels, each block having two layers with each layer comprising a convolutional and a rectified linear unit (ReLU) filters, and a skip connection between each block;
a final convolutional layer projecting the intermediate output to a 2D residual image; and
a clipping module clipping a residual subtracted image obtained by subtracting the 2D residual image from the multispectral image to a valid pixel value range for the reconstructed DPI.

22. The non-transitory computer-readable medium or media of claim 21 wherein the two layers of each block have different kernel sizes.

\* \* \* \* \*